No. 690,875. Patented Jan. 7, 1902.
B. F. PROFFITT.
ANIMAL POKE.
(Application filed Nov. 9, 1900.)
(No Model.)
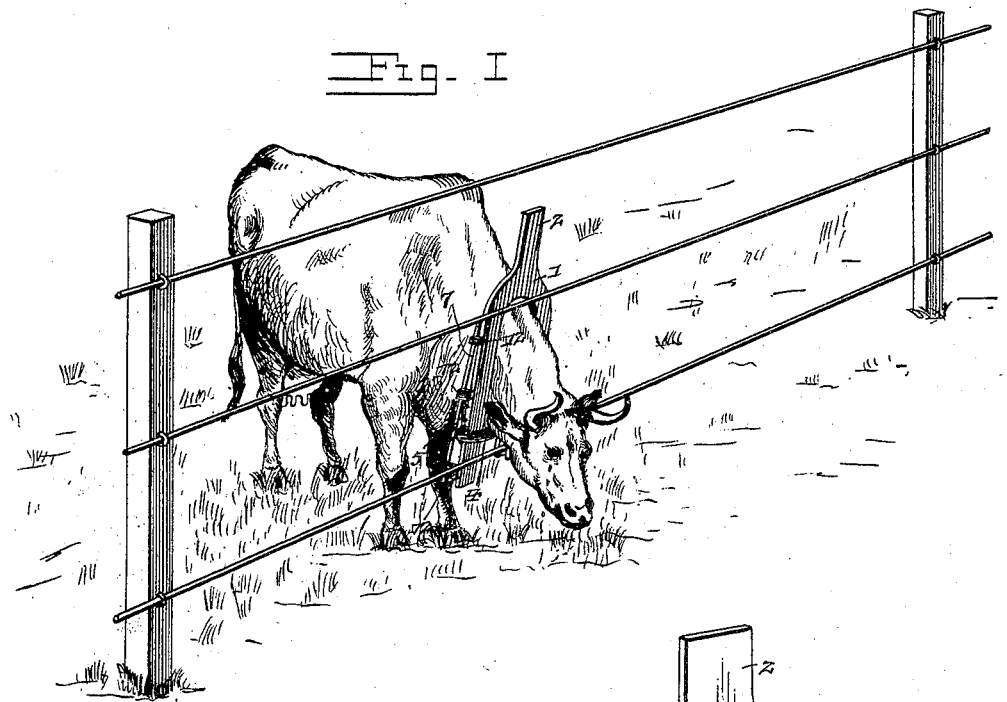
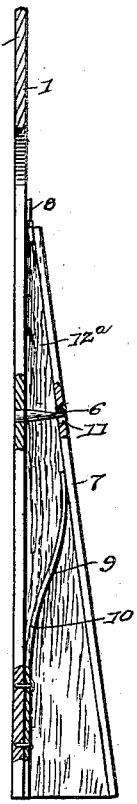
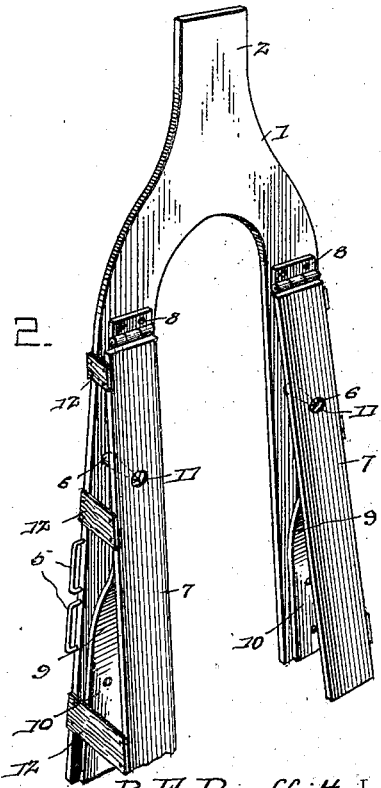
Witnesses
F. E. Alden
H. H. Riley
B. F. Proffitt, Inventor.
by C. A. Snow & Co.
Attorneys
THE NORRIS PETERS CO., PHOTO-LITHO., WASHINGTON, D. C.

UNITED STATES PATENT OFFICE.

BENJAMIN F. PROFFITT, OF LOVELAND, IOWA.

ANIMAL-POKE.

SPECIFICATION forming part of Letters Patent No. 690,875, dated January 7, 1902.

Application filed November 9, 1900. Serial No. 35,975. (No model.)

*To all whom it may concern:*

Be it known that I, BENJAMIN F. PROFFITT, a citizen of the United States, residing at Loveland, in the county of Pottawattamie and State of Iowa, have invented a new and useful Animal-Poke, of which the following is a specification.

The invention relates to improvements in animal-pokes.

The object of the present invention is to improve the construction of animal-pokes and to provide a simple, inexpensive, and efficient device adapted to be readily applied to the neck of an animal and to be worn without inconvenience to the same and capable of effectually preventing an animal from breaking through a fence or other barrier.

A further object of the invention is to provide a device of this character which will be particularly adapted to operate on fences where the wires and the posts are a considerable distance apart.

The invention consists in the construction and novel combination and arrangement of parts hereinafter fully described, illustrated in the accompanying drawings, and pointed out in the claim hereto appended.

In the drawings, Figure 1 is a perspective view of an animal-poke constructed in accordance with this invention and shown applied to an animal. Fig. 2 is a similar view, the device being detached. Fig. 3 is a vertical sectional view of the same, the hinged plates or members being shown compressed in dotted lines.

Like numerals of reference designate corresponding parts in all the figures of the drawings.

1 designates a yoke designed to be constructed of wood or other suitable material and consisting of an inverted-U-shaped body portion and a vertical arm or extension 2, projecting upward from the top of the body portion and arranged centrally above the space between the sides of the body portion. The yoke presents a flat front face, and it is designed to be placed on the neck of an animal and is adapted to straddle the same, as illustrated in Fig. 1 of the accompanying drawings, and the arm 2 projects upward above the neck of the animal and is adapted to engage a wire. By constructing the yoke in this manner it is capable of effectually engaging two wires, which are a considerable distance apart, and the device is thereby adapted for use in places where the fences are constructed in this manner.

The device is secured to the neck of an animal by means of a transverse slat 4, and the sides of the yoke are provided with staples 5, forming eyes at the outer side edges of the sides of the yoke, as clearly illustrated in Fig. 2. A series of vertical eyes may be employed to permit a vertical adjustment of the strap to adapt the device to animals of different sizes. The sides of the yoke are provided with rearwardly-extending pointed projections or spurs 6, which are adapted to prick or prod an animal, as hereinafter explained, and which are normally held out of engagement with the animal by means of a pair of depressible plates or members 7, extending longitudinally of the sides of the yoke and connected at their upper ends to the same by means of hinges 8. The longitudinal plates or members which form the back of the device are of substantially the same width as the sides of the yoke and present smooth flat faces to the animal, and they diverge downwardly from the sides of the yoke and are maintained in such position by springs 9, extending longitudinally of the sides of the yoke and secured at their lower ends 10 to the same and having their upper ends free and bearing against the inner faces of the hinged sides or plates 7. The sides or plates forming the back of the device are adapted to approach the sides of the yoke sufficiently to permit the spurs or projections to extend through perforations or openings 11 and prod the animal. Any number of spurs or projections may be provided, and when the yoke engages a fence or other obstruction the springs are compressed, and the spurs or projections are forced rearward into the shoulders of the animal, whereby the latter is effectually stopped and prevented from breaking or otherwise injuring a fence or the like. The plates or members are connected with the sides of the yoke by flexible pieces 12, which may consist of a series of straps, or a continuous piece $12^a$, extending from the upper to the lower ends of the plates or members, may be provided, if desired. The arrangement of the plates or members enables the same to form shields to prevent obstructions from lodging between the said plates or members and the sides of the yoke and interfering with the operation of the device, and any such accumulation or the like will be permitted to escape freely. The exterior hinges 8, which connect the plates to the sides of the yoke, entirely close the intervening spaces between those parts at the top of the plates. Instead of employing the springs 9 coiled springs may be arranged on the spurs or projections, and I desire it to be understood that these and similar changes within the scope of the claim may be resorted to without departing from the spirit or sacrificing any of the advantages of this invention.

It will be seen that the animal-poke is exceedingly simple and inexpensive in construction, that it is adapted to be readily applied to an animal, and that it is capable of automatically prodding the same and of effectually preventing it from breaking through a fence or other barrier.

Instead of making the yoke of a single piece of material, as illustrated in the accompanying drawings, it will be readily apparent that the sides of the yoke may be constructed of separate pieces and be suitably connected at the upper portion of the yoke, and these connections may be made adjustable to vary the distance between the sides. I desire it to be understood that these and similar changes may be resorted to without departing from the spirit or sacrificing any of the advantages of the invention.

What I claim is—

An animal-poke comprising a yoke adapted to straddle and rest upon the neck of an animal and having a top portion extending above the animal, said yoke being also provided with depending sides adapted to extend below the neck of the animal, the plates or members located at the sides of the yoke and hinged at their upper ends to the same, springs interposed between the sides of the yoke and the plates or members, spurs or projections normally arranged within the spaces between the plates or members and the sides of the yoke and adapted to project and engage an animal when the springs are compressed, and the continuous flexible connections or pieces arranged at the outer edges of the yoke and the plates or members and limiting the movement of the parts and closing the said spaces at the sides of the device, to protect the latter, substantially as described.

In testimony that I claim the foregoing as my own I have hereto affixed my signature in the presence of two witnesses.

BENJAMIN F. + PROFFITT.
his mark

Witnesses:
H. F. FOSS,
L. M. KELLOGG.